Patented Mar. 7, 1933

1,899,987

UNITED STATES PATENT OFFICE

WILLIAM L. RINTELMAN, OF MILWAUKEE, WISCONSIN, ASSIGNOR, BY MESNE ASSIGNMENTS, TO E. I. DU PONT DE NEMOURS & COMPANY, A CORPORATION OF DELAWARE

PROCESS OF PREPARING 1,5-DICHLORO-2,6-DIAMINO-ANTHRAQUINONE

No Drawing. Application filed April 20, 1931. Serial No. 531,632.

This invention relates to an improved process for preparing 1,5-dichloro-2,6-diaminoanthraquinone.

In my copending application Serial No. 531,631, filed of even date herewith, I have disclosed the novel product, 1,5-dichloro-2,6-diamino-anthraquinone-3,7-disulfonic acid, and a method of preparing the same. I have now found that this compound may be readily hydrolyzed to give 1,5-dichloro-2,6-diamino-anthraquinone in a high state of purity. This result was not to be foreseen in view of the fact that the bromine atoms in the analogous dibromo-diamino-anthraquinone-disulfonic acid wander during the hydrolysis step, with the result that instead of obtaining exclusively 1,5-dibromo-2,6-diamino-anthraquinone one obtains a product consisting largely, if not exclusively, of the isomeric 3,7-dibromo-2,6-diamino-anthroquinone. (See, for example, German Patents 263,395 and 275,299).

My discovery is of great technical significance since 1,5-dichloro-2,6-diamino-anthraquinone is an important intermediate in the production of dyestuffs of the anthraquinone-thiazole type. My discovery therefore leads to a new and efficient method for preparing dyestuffs of the anthraquinone-thiazole type economically and in a high state of purity.

My preferred method of hydrolysis consists of heating the novel 1,5-dichloro-2,6-diamino-anthraquinone-3,7-disulfonic acid in concentrated sulfuric acid at temperatures of about 165 to 220° C., or in 78% sulfuric acid at the reflux temperature of the mixture, until samples show the product to be substantially insoluble in water. The reaction mass is then drowned in water and the resulting precipitate is isolated.

Without limiting my invention to any particular procedure, the following example, in which parts by weight are given, will serve to illustrate my method in its preferred form.

Example 1 part of 1,5-dichloro-2,6-diamino-anthraquinone-3,7-disulfonic acid disodium salt is heated with from 10 to 20 parts of 93% sulfuric acid, at a temperature of about 165 to 220° C. until it becomes completely insoluble in water. The mass is then drowned in sufficient water, to produce a final concentration of about 10% sulfuric acid. The precipitate is now filtered off and washed with water. The filter cake when dry and pulverized is an orange to brown powder, constituting substantially pure 1,5-dichloro-2,6-diamino-anthraquinone.

Instead of drowning the reaction mass in water, the concentration of the acid may be reduced slightly, say to about 90 to 85%, and the mass allowed to cool. The 1,5-dichloro-2,6-diamino-anthraquinone sulfate then crystallizes in the form of grey crystals of exceptionally high purity.

Instead of using 93% sulfuric acid, other concentrations may be used, for example, any concentration between 78 to 95% has been found to be useful. In general, with the limits specified, the higher the acid concentration and the higher the temperature used, the higher is the speed of the hydrolysis reaction.

Instead of starting with 1,5-dichloro-2,6-diamino-anthraquinone, one may use any of the corresponding compounds in which the amino groups are substituted by readily hydrolyzable protective groups, such as acidyl groups or more specifically, acetyl groups, and the like. Similarly, I may start with the corresponding alkali metal salts of the disulfonic acid, or with a salt of the amine, such as the sulfate or hydrochloride. In general, I may apply my invention to any compound classifiable within the following general formula:

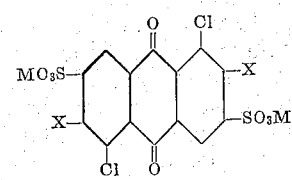

in which M stands for a hydrogen atom, an ammonium group, or a metallic radical, and X stands for an amino group in primary form or substituted by a readily hydrolyzable protective group.

Although I have described my preferred method of hydrolysis in great detail, it should be understood that other methods of hydrolysis which are generally applicable to aromatic sulfonic acids may be applied for the purpose of my invention.

I am aware that numerous details of the process may be varied through a wide range without departing from the principles of this invention, and I, therefore, do not purpose limiting the patent granted herein otherwise than necessitated by the prior art.

I claim as my invention:

1. The process of producing 1,5-dichloro-2,6-diamino-anthraquinone which comprises hydrolyzing a compound of the general formula:

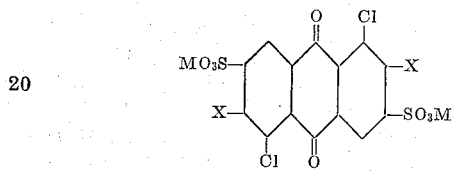

in which M stands for a hydrogen atom, an ammonium group, or a metallic radical, and X stands for an amino group, either primary or substituted by a readily hydrolyzable protective group.

2. The process of producing 1,5-dichloro-2,6-diamino-anthraquinone, which comprises hydralyzing 1,5-dichloro-2,6-diamino-anthraquinone-3,7-disulfonic acid.

3. A process as defined in claim 1, in which the hydrolysis is effected by heating in sulfuric acid.

4. A process as defined in claim 2, in which the hydrolysis is effected by heating in sulfuric acid.

5. A process of preparing 1,5-dichloro-2,6-diamino-anthraquinone which comprises heating 1,5-dichloro-2,6-diamino-anthraquinone-3,7-disulfonic acid in concentrated sulfuric acid at a temperature of about 165 to 220° C. until the product becomes substantially insoluble in water, drowning the reaction mass in water, and recovering the precipitate.

6. A process of preparing 1,5-dichloro-2,6-diamino-anthraquinone which comprises heating 1,5-dichloro-2,6-diamino-anthraquinone-3,7-disulfonic acid in concentrated sulfuric acid at a temperature of about 165 to 220° C. until the product becomes substantially insoluble in water, diluting the reaction mass to a sulfuric acid concentration of about 90 to 85%, and crystallizing out 1,5-dichloro-2,6-diamino-anthraquinone sulfate.

In testimony whereof I have hereunto subscribed my name at Carrollville, Milwaukee County, Wisconsin.

WILLIAM L. RINTELMAN.